(12) United States Patent
Lee et al.

(10) Patent No.: US 9,628,605 B2
(45) Date of Patent: Apr. 18, 2017

(54) MOBILE COMMUNICATION DEVICE

(71) Applicant: Samsung Display Co., Ltd., Yongin-si, Gyeonggi-Do (KR)

(72) Inventors: Taehee Lee, Gumi-si (KR); Wonsang Park, Yongin-si (KR); Yijoon Ahn, Seoul (KR); Myungim Kim, Yongin-si (KR); Sukman Yang, Seoul (KR); Yongsuk Yeo, Seongnam-si (KR)

(73) Assignee: SAMSUNG DIPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/801,543

(22) Filed: Jul. 16, 2015

(65) Prior Publication Data
US 2016/0142529 A1 May 19, 2016

(30) Foreign Application Priority Data

Nov. 19, 2014 (KR) ........................ 10-2014-0161746

(51) Int. Cl.
*H04M 1/725* (2006.01)
*H04M 1/03* (2006.01)
*H04M 1/60* (2006.01)

(52) U.S. Cl.
CPC .......... *H04M 1/72569* (2013.01); *H04M 1/03* (2013.01); *H04M 1/6008* (2013.01); *H04M 1/6016* (2013.01)

(58) Field of Classification Search
CPC .......................... H04R 19/013; H04M 1/6041
USPC ........................................ 455/569.1; 381/191
See application file for complete search history.

(56) References Cited

U.S. PATENT DOCUMENTS

| 4,246,449 A | 1/1981 | Biber |
| 8,014,539 B2 * | 9/2011 | Song ........................ H03F 1/02 381/74 |
| 8,184,833 B2 | 5/2012 | Demuynck |
| 8,670,580 B2 | 3/2014 | Lee |

(Continued)

FOREIGN PATENT DOCUMENTS

| KR | 10-2008-0108176 A | 12/2008 |
| KR | 10-2009-0128689 A | 12/2009 |

(Continued)

OTHER PUBLICATIONS

Sebastian Anthony, Berkeley creates the first graphene earphones, and (unsurprisingly) they're awesome.

*Primary Examiner* — Vladimir Magloire
*Assistant Examiner* — Majid Syed
(74) *Attorney, Agent, or Firm* — Ladas & Parry LLP

(57) ABSTRACT

A mobile communication device includes: a first sound transceiver including a first lower electrode, a first upper electrode, and a first vibration plate between the first lower electrode and the first upper electrode; a second sound transceiver including a second lower electrode, a second upper electrode, and a second vibration plate between the second lower electrode and the second upper electrode; a position sensor configured to perform a detection of a relative positional relationship between the first and second sound transceivers; and a controller configured to apply a sound signal to one of the first and second sound transceivers and detect a sound signal from the other one thereof, based on the detection result provided from the position sensor.

20 Claims, 6 Drawing Sheets

(56) References Cited

U.S. PATENT DOCUMENTS

| | | | |
|---|---|---|---|
| 2003/0095666 A1* | 5/2003 | Ramage | H03F 1/3205 381/2 |
| 2007/0195976 A1* | 8/2007 | Sekino | H04R 19/013 381/191 |
| 2007/0242844 A1 | 10/2007 | Harman | |
| 2008/0146289 A1* | 6/2008 | Korneluk | H04M 1/6041 455/569.1 |
| 2012/0148074 A1 | 6/2012 | Bastiaens et al. | |
| 2014/0077094 A1 | 3/2014 | Dinh et al. | |

FOREIGN PATENT DOCUMENTS

| | | |
|---|---|---|
| KR | 10-2010-0082378 A | 7/2010 |
| WO | 2014/059638 A1 | 4/2014 |

* cited by examiner

MOBILE COMMUNICATION DEVICE

CLAIM OF PRIORITY

This application claims the priority to and all the benefits of Korean Patent Application No. 10-2014-0161746, filed on Nov. 19, 2014, with the Korean Intellectual Property Office (KIPO), the disclosure of which is incorporated herein in its entirety by reference.

BACKGROUND OF THE INVENTION

1. Field of Disclosure

Embodiments of the present invention relate to a mobile communication device capable of providing users with a normal phone call environment, even though the user holds the mobile communication device upside down.

2. Description of the Related Art

A mobile communication device refers to a mobile device that provides one or more functions of, for example, a voice and video phone calling function while moving around, an information input and output function, and a data storing function. Such a mobile communication device may include a speaker and a mike so as to support voice phone calls and to play audio sources.

When a speaker and a mike are adjacently disposed, voice played from the speaker may be inputted to the mike, thereby causing howling. Accordingly, a mike and a speaker may be spaced most widely from each other in a case of a mobile communication device, to minimize interference therebetween. In general, a speaker is disposed at an upper portion of a mobile communication device and a mike is disposed at a lower portion thereof.

With the above structure, when a user holds the mobile communication device upside down for the lower portion to be placed upper than the upper portion, a mike may be placed next to an ear of a user and a speaker next to a mouth of the user. In this case, voices of the calling parties may not be properly transmitted, which disrupts phone calls.

Such abnormal phone calls may be easily attributed to quality defects of a telephone call, malfunction of a mobile phone, or a wrong-number phone call. In this case, users may miss important phone calls.

In particular, such cases may frequently happen in a dark environment or when a user with visual impairment may not easily distinguish position of a mike and a speaker of a mobile communication device.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a mobile communication device capable of providing a normal phone call environment although a user holds the mobile communication device upside down.

According to an exemplary embodiment, a mobile communication device includes: a first sound transceiver including a first lower electrode, a first upper electrode, and a first vibration plate between the first lower electrode and the first upper electrode; a second sound transceiver including a second lower electrode, a second upper electrode, and a second vibration plate between the second lower electrode and the second upper electrode; a position sensor configured to perform a detection of a relative positional relationship between the first and second sound transceivers; and a controller configured to apply a sound signal to one of the first and second sound transceivers and detect a sound signal from the other one thereof, based on the detection result provided from the position sensor.

The controller may apply a sound signal to the first sound transceiver and detect a sound signal from the second sound transceiver, when the first sound transceiver is placed higher than the second sound transceiver.

The controller may apply a sound signal to the first lower electrode and the first upper electrode and apply a first bias voltage to the first vibration plate, and may apply a second bias voltage to the second lower electrode and detect a sound signal from the second vibration plate.

The controller may apply a sound signal to the second sound transceiver and detect a sound signal from the first sound transceiver, when the second sound transceiver is placed higher than the first sound transceiver.

The controller may apply a sound signal to the second lower electrode and the second upper electrode and apply a second bias voltage to the second vibration plate, and may apply a first bias voltage to the first lower electrode and detect a sound signal from the first vibration plate.

The first and second lower electrodes may have a groove and a hole formed within the groove and extending through corresponding lower electrodes.

The mobile communication device may further include a spacer disposed at least one of between the first lower electrode and the first vibration plate, between the first vibration plate and the first upper electrode, between the second lower electrode and the second vibration plate, and between the second vibration plate and the second upper electrode.

The controller may include: a first driver configured to amplify an externally applied sound signal and generate a first bias voltage; a second driver configured to detect a sound signal from one of the first and second sound transceivers and generate a second bias voltage; and a switch configured to apply the amplified sound signal and the first bias voltage applied from the first driver to one of the first and second sound transceivers and to apply the second bias voltage applied from the second driver to the other one thereof, based on the detection result provided from the position sensor.

When the first sound transceiver is placed higher than the second sound transceiver, the first driver may apply a sound signal to the first lower electrode and the first upper electrode and apply a first bias voltage to the first vibration plate; and the second driver may apply a second bias voltage to the second lower electrode and detect a sound signal from the second vibration plate.

When the second sound transceiver is placed higher than the first sound transceiver, the first driver may apply a sound signal to the second lower electrode and the second upper electrode and apply a first bias voltage to the second vibration plate; and the second driver may apply a second bias voltage to the first lower electrode and detect a sound signal from the first vibration plate.

The first driver may include: an amplifier configured to amplify an externally applied sound signal; a transformer configured to transform the amplified sound signal applied from the amplifier; and a bias power configured to generate the first bias voltage.

The second driver may include: a voltage adjuster configured to generate first and second reference voltages based on an externally applied power voltage; a voltage multiplier configured to generate a second bias voltage based on the first and second reference voltages applied from the voltage adjuster; and a detector configured to detect a sound signal from one of the first and second sound transceivers.

The detector may further reduce impedance of the detected sound signal, amplify the modulated sound signal, and convert the amplified sound signal to a digital signal.

The position sensor may be a gravity sensor.

According to embodiments of the present invention, a mobile communication device may have the following effects.

A mobile communication device according to exemplary embodiments may include first and second sound transceivers that may automatically function as one of a speaker and a mike according to its position. Accordingly, the mobile communication device may provide a normal phone call environment although a user holds a mobile communication device upside down.

Further, a lower electrode of the mobile communication device may have a groove and a hole formed thereinside, thereby capable of playing even subtle sound.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Figure 1:
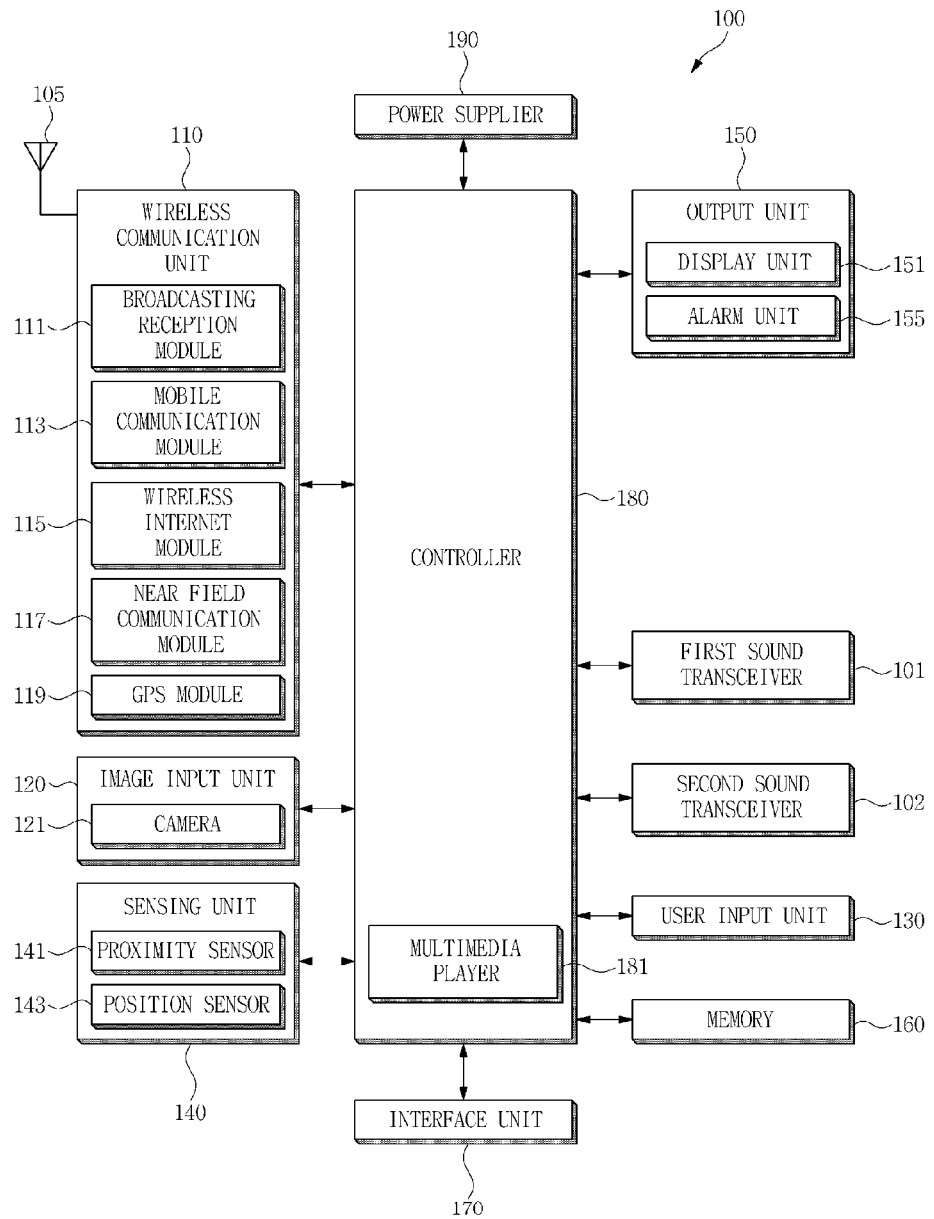
FIG. 1 is a block diagram illustrating a mobile communication device according to an exemplary embodiment.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

In the drawings, thicknesses are illustrated in an enlarged manner in order to clearly describe a plurality of layers and areas. Like reference numbers are used to denote like elements throughout the specification. When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Herein, a mobile communication device may include a mobile phone, a smart phone, a notebook computer, a digital broadcasting terminal, a personal digital assistant (PDA), a portable multimedia player (PMP), and navigation. Further, suffixes "module" and "part" for components used herein are simply given for ease of description and may not impart particular significance or role by itself. Thus, the terms "module" and "part" may be interchangeable.

Herein, "sound" is to be understood as having concept including both sound produced by an object and voice of a human being.

FIG. 1 is a block diagram illustrating a mobile communication device 100 according to an exemplary embodiment. Functional configurations of the mobile communication device 100 according to an exemplary embodiment will be described with reference to FIG. 1.

Referring to FIG. 1, the mobile communication device 100 may include a wireless communication unit 110, an image input unit 120, a user input unit 130, a sensing unit 140, an output unit 150, a memory 160, an interface unit 170, a controller 180, and a power supplier 190. Each of the configurations may be subdivided into two or more components or two or more configurations may be combined into a single component, where necessary in actual applications.

The wireless communication unit 110 may include a broadcasting reception module 111, a mobile communication module 113, a wireless internet module 115, a near field communication module 117, and a global position system (GPS) module 119. Herein, the wireless communication unit 110 may externally receive information using an antenna 105.

The broadcasting reception module 111 may receive at least one of broadcasting signals and broadcasting information from an external broadcast management server over broadcast channels. In this case, the broadcast channel may include, for example, a satellite channel and a terrestrial channel. The broadcast server may refer to a server that generates and transmits at least one of broadcasting signals and broadcasting information or a server that receives at least one of the generated broadcasting signals and broadcasting information to thereby transmit to a terminal.

The broadcasting information may refer to information pertaining to broadcasting channels, broadcasting programs, or broadcasting service providers. The broadcasting signal may include TV broadcasting signals, radio broadcasting signals, data broadcasting signals, and may also include broadcasting signals of data broadcasting signals combined with the TV broadcasting signals or radio broadcasting signals. The broadcasting information may be provided over a wireless communication network and may be, in this case, received by the mobile communication module 113. The broadcasting information may be present in many different forms. The broadcasting information may be provided in the form of, for example, electronic program guide (EPG) of digital multimedia broadcasting (DMB) or electronic service guide (ESG) of digital video broadcast-handheld (DVB-H).

The broadcasting receiving module 111 may receive broadcasting signals, employing various broadcasting systems, such as, in particular, digital broadcasting systems including digital multimedia broadcasting-terrestrial (DMB-T), digital multimedia broadcasting-satellite (DMB-S), media forward link only (MediaFLO), digital video broadcast-handheld (DVB-H), and integrated services digital broadcast-terrestrial (ISDB-T). Further, the broadcasting receiving module 111 may be composed to be applicable to all broadcasting systems that provide broadcasting signals, as well as the digital broadcasting system. The broadcasting signals and/or broadcasting information provided by the broadcasting receiving module 111 may be stored in the memory 160.

The mobile communication module 113 may perform transmission and/or reception with at least one of a base station, an external terminal, and a server over a wireless communication network. Herein, the wireless signal may include various types of data according to transmission and/or reception of voice call signals, video phone call signals, short message service (SMS), or multimedia message.

The wireless internet module 115 refers to a module for wireless internet connection. The wireless internet module 115 may be equipped within the mobile communication device 100 or may be equipped exteriorly. Wireless LAN (WLAN), Wi-Fi, wireless broadband (Wibro), world interoperability for microwave access (Wimax), and high speed downlink packet access (HSDPA) may be employed as wireless internet technology.

The near field communication module 117 may perform near field communication with another mobile communication device using, for example, bluetooth, radio frequency identification (RFID), infrared data association (IrDA), ultra wideband (UWB), and zigbee (ZigBee).

The GPS module 119 may receive location information from a plurality of GPS satellites. The GPS module 119 may receive location information of the mobile communication device 100 and provide the received location information to the controller 180.

The image input 120 is configured to externally receive image signals and may include, for example, a camera 121. The camera 121 may process image frames such as still images or moving images obtained by an image sensor, in a video phone call mode or a photography mode. The processed image frame may be displayed on a display unit 151.

The image frames processed by the camera 121 may be stored in the memory 160 or transmitted outwards through the wireless communication unit 110. Two or more of the cameras 121 may be provided according to the configuration of the mobile communication device 100.

The user input 130 is configured to input various instructions of users for controlling operation of the mobile communication device 100. The user input 130 may include a key pad, a dome switch, a touchpad (static pressure/electrostatic), a jog wheel, a jog switch, a finger mouse, and the like. In particular, a touch screen refers to a structure where a touchpad forms an inter-systematic structure with the display unit 151 described below.

The sensing unit 140 may detect the current state of the mobile communication device 100, such as open and close state, position, and presence of user contact of the mobile communication device 100 to thereby generate sensing signals to control operation of the mobile communication device 100. For instance, when the mobile communication device 100 is provided in a slide phone type, the sensing unit 140 may detect the open and close state of the slide phone. Further, the sensing unit 140 may detect presence of power supply from the power supplier 190 and whether or not the interface unit 170 is connected to an external device.

The sensing unit 140 may include a proximity sensor 141 and a position sensor 143.

The proximity sensor 141 may detect an approaching object or the presence of an adjacent object without mechanical connection. The proximity sensor 141 may utilize variation of alternating magnetic field, variation of static magnetic field, or a variation ratio of capacitance so as to detect an adjacent object. Two or more proximity sensors 141 may be provided according to configuration of the mobile communication device 100.

The position sensor may detect a relative positional relationship between the first and second sound transceivers. For instance, the position sensor may be a gravity sensor that determines a relative positional relationship between the first and second sound transceivers 101 and 102 with respect to a gravity direction.

The output unit 150 is configured to output image signals or alarm signals. The output unit 150 may include, for example, the display unit 151 and an alarm unit 155.

The display unit 151 may display information processed from the mobile communication device 100. For instance, the display unit 151 may display, when the mobile communication device 100 is in a phone call mode, user interface (UI) or graphic user interface (GUI) that are associated with phone calls. Further, the display unit 151 may display, when the mobile communication device 100 is in a video phone call mode or a photography mode, filmed images and provided images respectively or simultaneously. In this case, the display unit 151 may further display UI or GUI.

Meanwhile, as set forth above, when the display unit 151 and the touchpad inter-systematically constitute a touch screen, the display unit 151 may be utilized as an input device. The display unit 151 may include, when utilized as a touch screen, a touch screen panel and a touch screen panel controller. In this case, the touch screen panel may be a transparent panel attached outside and may be connected to an internal bus of the mobile communication device 100. The touch screen panel may monitor presence of touch and may apply, when a touch input occurs, corresponding signals to the touch screen panel controller. The touch screen panel controller may process the signals and transmit data corresponding to the signals to the controller 180. The controller 180 may recognize the presence of a touch input and which area of the touch screen is touched.

The display unit 151 may include at least one of an LCD, an OLED display, a flexible display, and a 3D display. Further, two or more display units 151 may be provided according to the type of the mobile communication device 100. In some embodiments, both an external display unit (not illustrated) and an internal display unit (not illustrated) may be provided together in the mobile communication device 100.

The first and second sound transceivers 101 and 102 may function as one of a speaker and a mike according to the relative positional relationship therebetween. For instance, when the first sound transceiver 101 is placed higher than the second sound transceiver 102, with respect to the gravity direction, the first sound transceiver 101 may function as a speaker while the second sound transceiver 102 may function as a mike. In contrast, when the second sound transceiver 102 is placed higher than the first sound transceiver 101, with respect to the gravity direction, the second sound transceiver 102 may function as a speaker while the first sound transceiver 101 may function as a mike.

When the first sound transceiver 101 functions as a speaker, the first sound transceiver 101 may output sound signals provided from the wireless communication unit 110 or sound signals stored in the memory 160, in a call signal reception mode, a voice call mode, a video phone call mode, a record mode, a voice recognition mode, or a broadcasting reception mode. Further, the first sound transceiver 101 that functions as a speaker may output sound signals associated with functions performed in the mobile communication device 100, such as an incoming call sound and an incoming message sound.

Meanwhile, when the first sound transceiver 101 functions as a mike, the first sound transceiver 101 may externally receive sound and convert the sound into electric sound signals, in the voice call mode, the video phone call mode, the record mode, and the voice recognition mode. The converted sound signal, when the mobile communication device 100 is in the voice call mode or the video phone call mode, may be converted into a form that can be transmitted to a wireless communication base station through the mobile communication module 113. The first sound transceiver 102 functioning as a mike may employ various noise removal algorithm so as to remove noise occurring when externally receiving sound.

The second sound transceiver 102 may operate identically to the first sound transceiver 101. That is, operation of the second sound transceiver 102 as a speaker is identical to the operation of the first sound transceiver 101 as a speaker, and operation of the second sound transceiver 102 as a mike is identical to the operation of the first sound transceiver 101 as a mike.

The alarm unit 155 may output signals to notify occurrence of events of the mobile communication device 100. Examples of the event occurring at the mobile communication device 100 may include, for example, an incoming call, an incoming message, and an input key signal. The alarm unit 155 may output other types of signals, rather than sound signals or video signals, to notify occurrence of events. In some embodiments, the alarm unit 155 may output vibration signals. When there is an incoming call or an incoming message, the alarm unit 155 may output signals to notify the reception. Further, when a key signal is input, the alarm unit 155 may output a signal as a feedback in response to the input key signal.

Users may recognize the occurrence of events with the signals outputted from the alarm unit 155. The signals notifying occurrence of events may be outputted through the display unit 151 and one of the first and second sound transceivers 101 and 102 in the mobile communication device 100.

The memory 160 may be stored with programs to process and control the controller 180 and may function to temporally store input or output data (e.g., a phone book, a message, a static image, and a video).

The memory 160 may include at least one type of storage mediums of a flash memory, a hard disk, a multimedia microcard, a card type memory (e.g., a secure digital (SD) memory or an XD memory), RAM, and ROM.

The interface unit 170 may function as an interface with all external devices connected to the mobile communication device 100. Examples of the external devices connected to the mobile communication device 100 may include a wire/wireless headset, an external charger, a wire/wireless data port, a memory card, a card socket for SIM/UIM cards, an audio input/output (I/O) terminal, a video TO, and an earphone. The interface unit 170 may receive data or power from the external device and transmit the data or power to each element within the mobile communication device 100 and may also transmit the inside data of the mobile communication device 100 to the external device.

The controller 180 may control each of the above-described elements to control overall operation of the mobile communication device 100. For instance, the controller 180 may control and perform processes of a voice call, data communication, a video phone call, and the like.

Further, the controller 180 may include a multimedia player 181 for playing multimedia. The multimedia player 181 may be provided as hardware within the controller 180.

In some embodiments, the multimedia player 181 may be formed separately from the controller 180, and may be, in this case, formed as software.

Further, based on the detection result provided from the position sensor 143, the controller 180 may provide sound signals to one of the first and second sound transceivers 101 and 102 and detect sound signals from the other one thereof. In other words, when relative positional relationship between the first and second sound transceivers 101 and 102 is determined by the position sensor 143, the controller 180 may determine which one of the two sound transceivers 101 and 102 to operate as a speaker. When a sound transceiver to be operated as a speaker is selected, the other sound transceiver, which is not selected, may be automatically controlled to function as a mike. The operation of the controller 180 is described below in detail with examples.

For instance, when a user holds a mobile communication device 100 upright, the first sound transceiver 101 is placed higher than the second sound transceiver 102. In this case, the first sound transceiver 101 is placed next to the user's ear and the second sound transceiver 102 is placed next to the user's mouth. In this case, a position sensor 143 may detect the position and provide information on the relative positional relationship between the sound transceivers 101 and 102 to a controller 180. Next, the controller 180 may apply sound signals to the first sound transceiver 101 and detect sound signals from the second sound transceiver 102. Accordingly, the first sound transceiver 101 may function as a speaker and the second sound transceiver 102 may function as a mike. Then, sound may be output outwardly of the mobile communication device 100 through the first sound transceiver 101 functioning as a speaker and sound may be input inwardly of the mobile communication device 100 through the second sound transceiver 102 functioning as a mike. In detail, in the case of the voice call mode, the first sound transceiver 101 functioning as a speaker may transmit voice signals of another user on the phone provided from the wireless communication unit 110 to the user of the mobile communication device 100. Further, in the voice call mode, the second sound transceiver 102 functioning as a mike may receive voice of the user of the mobile communication device 100 and convert the voice into electric sound signals. The converted sound signals may be transmitted to a mobile communication device 100 of the another user on the phone via the mobile communication module 113.

In contrast, when a user holds a mobile communication device 100 upside down (i.e., a lower portion is placed higher than an upper portion), the second sound transceiver 102 is placed higher than the first sound transceiver 101. In this case, the second sound transceiver 102 is placed next to the user's ear and the first sound transceiver 101 is placed next to the user's mouth. Then, the position sensor may detect the position and provide information on the relative positional relationship between the two sound transceivers 101 and 102 to a controller 180. Next, the controller 180 may apply sound signals to the second sound transceiver 102 and detect sound signals from the first sound transceiver 101. Accordingly, the second sound transceiver 102 may function as a speaker and the first sound transceiver 101 may function as a mike. Then, sound may be output outwardly of the mobile communication device 100 through the second sound transceiver 102 and sound may be input inwardly of the mobile communication device 100 through the first sound transceiver 101. For instance, the second sound transceiver 102 functioning as a speaker may transmit voice signals of another user on the phone provided from the wireless communication unit 110 to the user of the mobile communication device 100. Further, the first sound transceiver 101 functioning as a mike may receive voice of the user of the mobile communication device 100 and convert the voice into electric sound signals. The converted sound signals may be transmitted to a mobile communication device 100 of the another user on the phone via the mobile communication module 113.

Accordingly, the mobile communication device 100 according to embodiments of the present invention may provide users with a normal phone call environment although a user holds a mobile communication device 100 upside down.

The power supplier 190 may receive external and inner power and provide each element with the power required for the operation, which is controlled by the controller 180.

The mobile communication device 100 with the above configuration may include a wire/wireless communication system and a satellite-based communication system to be operable in a communication system where data may be transmitted through frames and packets.

Hereinafter, the mobile communication device 100 according to an exemplary embodiment will be described with respect to exterior appearance. Hereinafter, a bar-type mobile communication device is described as an example, for ease of description, among mobile communication device types of a folder type, a bar type, a swing type, and a slider type. However, the present invention is not limited to the bar type mobile communication device, and thus applicable to all types of mobile communication devices including the bar type.

Figure 2:
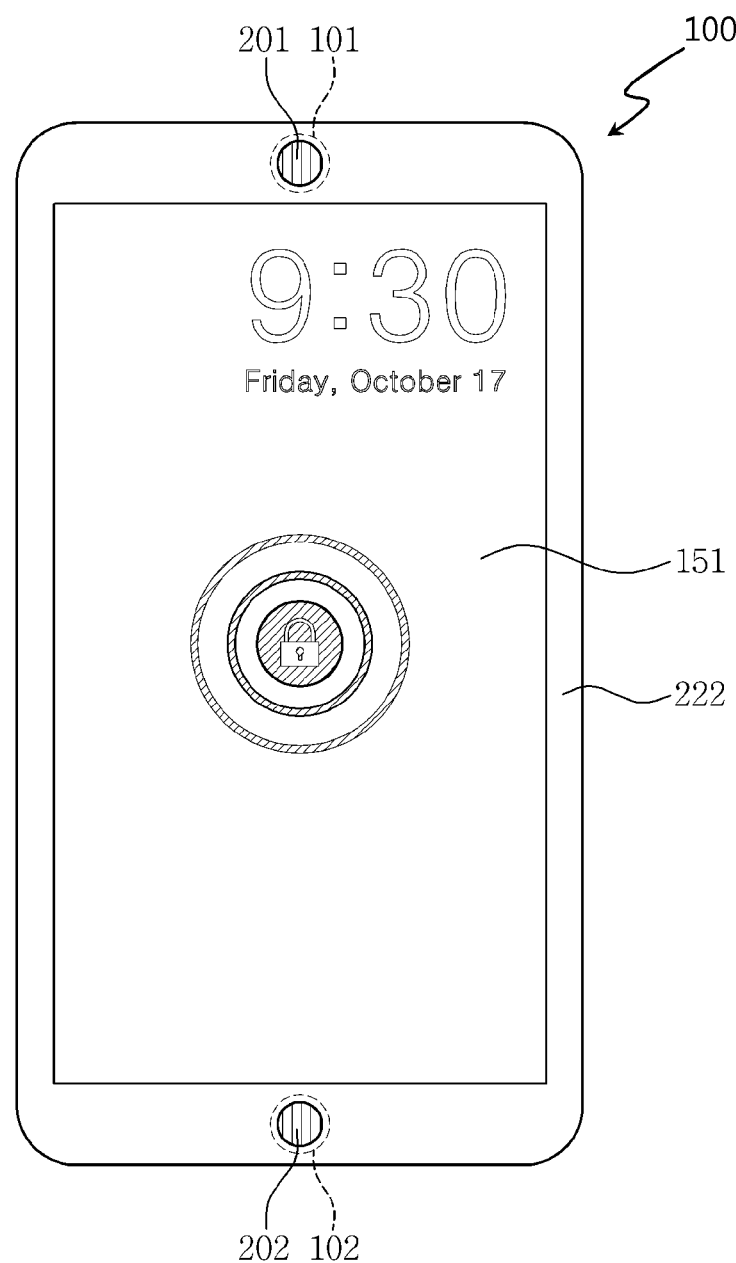
FIG. 2 is a view illustrating exterior appearance of the mobile communication device according to an exemplary embodiment.

FIG. 2 is a view illustrating exterior appearance of the mobile communication device 100 according to an exemplary embodiment.

The mobile communication device 100 may include, as illustrated in FIG. 2, a display unit 151 and a case 222 that surrounds the display unit.

The display unit 151 may include, for example, an LCD or an OLED that visually displays information. The display unit 151 may include touchpads overlapped with each other in a layer structure, such that the display unit 151 may operate as a touch screen to allow a user to input information by touch. A first sound transceiver 101 may be realized into a receiver or a speaker form. The first camera 121a may be realized to allow users to photograph images or to film videos.

The case 222 may cover an edge portion and a rear surface of the display unit 151. The first and second sound transceivers 101 and 102 may be disposed within the case 222. The first sound transceiver 101 may be disposed at one end portion of the mobile communication device 100 and the second sound transceiver 102 may be disposed at another end portion of the mobile communication device 100. Herein, the one end portion and the another end portion may be an upper portion and a lower portion of the mobile communication device 100, respectively.

The case 222 may further include first speaker grill 201 and second speaker grill (not shown) and first and second holes (not shown) into which the first and second speaker grills are respectively inserted. The first and second speaker grills may be a cylinder in shape. The first speaker grill may have a plurality of holes extending therethrough and the second speaker grill may have a plurality of holes extending therethrough. The first speaker grill 201 may be disposed on the first sound transceiver 101 and the second speaker grill (not shown) may be disposed on the second sound transceiver 102.

The case 222 may be formed by injecting synthetic resins and may include metal materials, such as stainless steel (STS) or titanium (Ti).

Figure 3A:
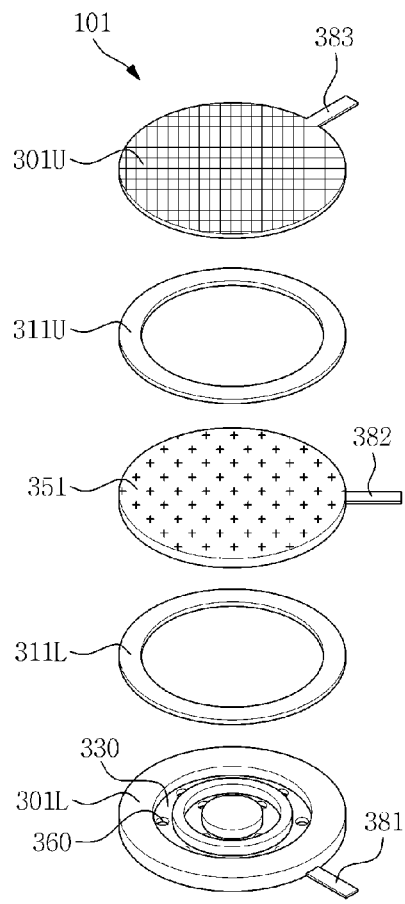
FIGS. 3A and 3B are exploded perspective views illustrating first and second sound transceivers, respectively, of FIG. 2.
Figure 3B:
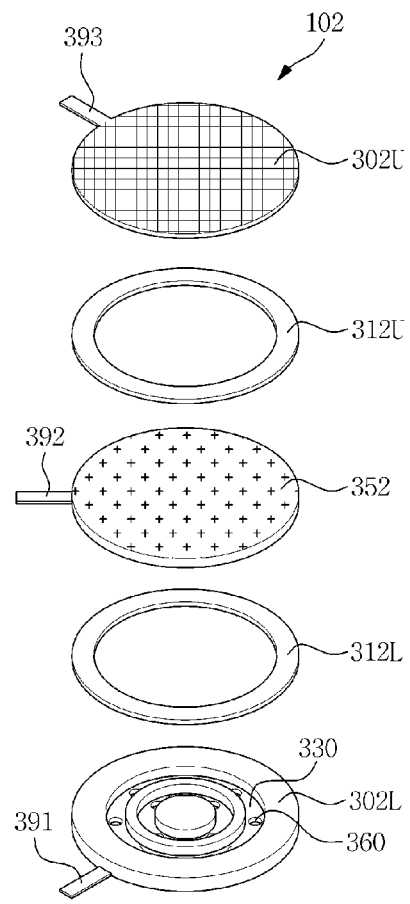

FIGS. 3A and 3B are exploded perspective views illustrating first and second sound transceivers 101 and 102, respectively, of FIG. 2.

The first sound transceiver 101 may include, as illustrated in FIG. 3A, the first lower electrode 301L, a first lower spacer 311L, a first vibration plate 351 (e.g. diaphragm), a first upper spacer 311U and the first upper electrode 301U.

The first lower electrode 301L may be disposed on a base surface within the case 222. The first lower electrode 301L may include a film and a conductive layer disposed on one surface of the film. Herein, the one surface of the film refers to a surface facing the first lower spacer 311L. The film may be a synthetic resin film having insulating and flexible properties, such as polyethylene terephthalate (PE) or polypropylene (PP). The conductive layer may be metal having conductive properties. The conductive layer may be attached on one surface of the film in a deposition method. Further, at least one groove 330 may be formed on one surface of the first lower electrode 301L. The groove 330 may be circular in shape, surrounding a center portion of the first lower electrode 301L. Further, within each groove 330, at least one hole 360 extending through the first lower electrode 301L may be formed. Air and sound may pass through the first lower electrode 301L through the holes 360. The first lower electrode 301L may be circular in shape. Meanwhile, the first lower electrode 301L may include an electrode 381 to receive sound signals or a second bias voltage.

The first lower spacer 311L may be disposed on the first lower electrode 301L. The first lower spacer 311L may pass air and sound therethrough. The first lower spacer 311L may not, however, pass electricity therethrough. The first lower spacer 311L may have elasticity, and thus may be deformed under external force and then return to its original shape when the external force is removed. The first lower spacer 311L may include materials such as felt. The first lower spacer 311L may be provided in a loop shape with an empty center portion.

The first vibration plate 351 may be disposed on the first lower spacer 311L. The first vibration plate 351 may include a film and a conductive layer disposed on one surface of the film. Herein, the one surface of the film refers to a surface facing the first lower spacer 311L. The film may be a synthetic resin film having insulating and flexible properties, such as PE or PP. The conductive layer may be metal having conductive properties. For instance, one of graphene, platinum (Pt), gold (Au), diamond-like carbon (DLC) may be utilized as materials of the conductive layer. The conductive layer may be attached on one surface of the film in a deposition method. The first vibration plate 351 may be circular in shape. Meanwhile, the first vibration plate 351 may include an input terminal 382 to receive a first bias voltage. The input terminal may be a part of the conductive layer. The first vibration plate 351 may be called as a diaphragm.

The first upper spacer 311U may be disposed on the first vibration plate 351. The first upper spacer 311U may have identical configurations and materials as in the first lower spacer 311L. Meanwhile, at least a part of an edge portion of the first upper spacer 311U may be bonded to at least a part of an edge portion of the first lower spacer 311L using an adhesive member.

The first upper electrode 301U may be disposed on the first upper spacer 311U. The first upper electrode 301L may include a film and a conductive layer disposed on one surface of the film. The film may be a synthetic resin film having insulating and flexible properties, such as PE or PP, as described above. The conductive layer may be metal having conductive properties. The conductive layer may be attached on one surface of the film in a deposition method. Further, the first upper electrode 301U may have a plurality of holes extending therethrough, such that air and sound may pass through the first upper electrode 301U. The holes may be arranged in a mesh shape. Meanwhile, the first upper electrode 301U may include an input terminal 383 to receive sound signals. The input terminal 383 may be a part of the conductive layer. A sound signal applied to the first upper electrode 301U and a sound signal applied to the second lower electrode 301L may respectively have voltages opposite in polarity.

The second sound transceiver 102 may include, as illustrated in FIG. 3B, the second lower electrode 302L, a second lower spacer 312L, a second vibration plate 352, a second upper spacer 312U, and the second upper electrode 302U. The second lower electrode 302L may include an electrode 391 to receive sound signals or a second bias voltage, and the second vibration plate 352 may include an input terminal 392 to receive a first bias voltage, and the second upper electrode 302U may include an input terminal 393 to receive sound signals.

The second lower electrode 302L, the second lower spacer 312L, the second vibration plate 352, the second upper spacer 312U, and the second upper electrode 302U may be identical to the first lower electrode 302L, the first lower spacer 312L, the first vibration plate 352, the first upper spacer 312U, and the first upper electrode 302U, and thus repeated description will not be provided.

As described above, the first and second sound transceivers 101 and 102 may be substantially identical in configuration. The first and second sound transceivers 101 and 102 may, however, function as a speaker or a mike according to a signal applied thereto. For instance, when a sound signal is applied to the first lower electrode 301L and the first upper electrode 301U and a first bias voltage is applied to the first vibration plate 351, the first sound transceiver 101 may function as a speaker. In contrast, when a second bias voltage is applied to the first lower electrode 301L and the first upper electrode 301U is subject to floating, the first sound transceiver 101 may function as a mike. In this case, sound signal may be detected by the first vibration plate 351. Likewise, when a sound signal is applied to the second lower electrode 302L and the second upper electrode 302U and a first bias voltage is applied to the second vibration plate 352, the second sound transceiver 102 may function as a speaker. In contrast, when the second bias voltage is applied to the second lower electrode 302L and the second upper electrode 302U is subject to floating, the second sound transceiver 102 may function as a mike.

In order to selectively supply the sound signal, the first and second bias voltages to the first and second sound transceiver 101 and 102, the controller 180 may have the following configuration.

Figure 4:
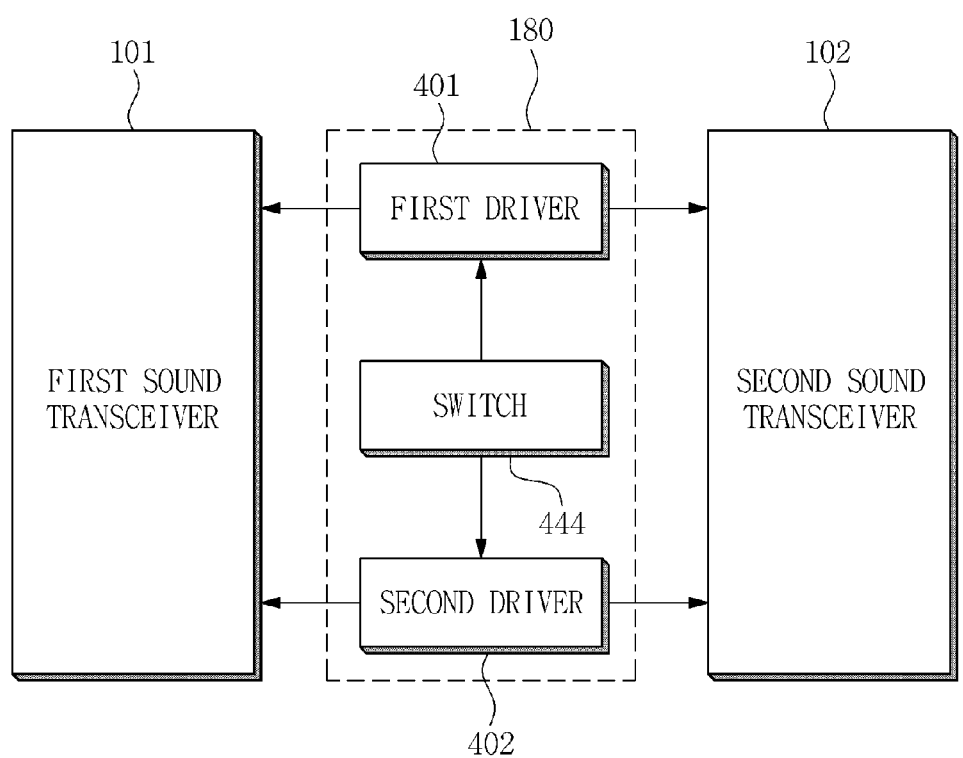
FIG. 4 is a block diagram illustrating a controller of FIG. 1.

FIG. 4 is a block diagram illustrating a controller of FIG. 1.

The controller 180 may include, as illustrated in FIG. 4, a first driver 401, a second driver, and a switch.

The first driver 401 may amplify externally applied sound signals and generate a first bias voltage. Herein, the externally applied sound signal may be an alternating current (AC) voltage and may be, for example, voice signals of another user applied from the wireless communication unit 110.

The second driver 402 may detect sound signals from one of the first and second sound transceivers 101 and 102 and generate a second bias voltage. Herein, the sound signal may be an analog signal and may be, for example, a signal generated based on voice of the user of the mobile communication device 100.

The switch 444 may determine a sound transceiver 101 or 102 to be connected to the first driver 401 and determine a sound transceiver 101 or 102 to be connected to the second driver 402, based on the detection result provided from the position sensor 143. In other words, the switch 444 may provide the amplified sound signal applied from the first driver 401 and the first bias voltage to one of the first and second sound transceivers 101 and 102, based on the detection result provided from the position sensor 143. Then, the switch 444 may provide the second bias voltage applied from the second driver 402 to the other sound transceiver. The operation is described in detail with the following examples.

In a case where the first sound transceiver 101 is placed higher than the second sound transceiver 102, the controller 180 may electrically connect the first driver 401 and the first sound transceiver 101 and electrically connect the second driver 402 and the second sound transceiver 102. Accordingly, sound signals may be applied to the first lower electrode 301L and the first upper electrode 301U of the first sound transceiver 101 and a first bias voltage may be applied to the first vibration plate 351. Then, when a second bias voltage is applied to the second lower electrode 302L of the second sound transceiver 102 and the second upper electrode 302U is subject to floating, a detection terminal of the second driver 402 is connected to an electrode of the second vibration plate 352.

In another case where the second sound transceiver 102 is placed higher than the first sound transceiver 101, the controller 180 may electrically connect the first driver 401 and the second sound transceiver 102 and electrically connect the second driver 402 and the first sound transceiver 101. Accordingly, sound signals may be applied to the second lower electrode 302L and the second upper electrode 302U of the second sound transceiver 102 and a first bias voltage may be applied to the second vibration plate 352. Then, when a second bias voltage is applied to the first lower electrode 301L of the first sound transceiver 101 and the first upper electrode 301U is subject to floating, a detection terminal of the second driver 402 is connected to an electrode of the first vibration plate 352.

Figure 5:
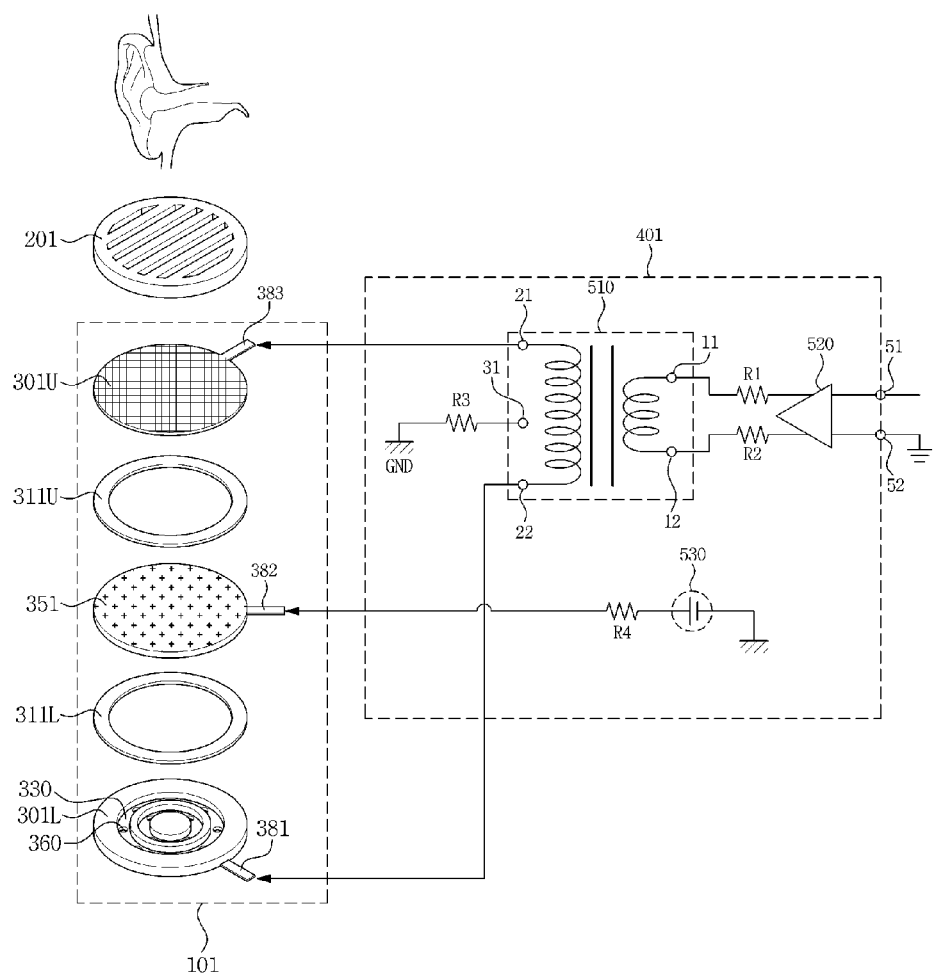
FIG. 5 is a detailed configuration view illustrating a first driver of FIG. 4.

FIG. 5 is a detailed configuration view illustrating the first driver 401 of FIG. 4. In particular, FIG. 5 illustrates connection relationship between the first sound transceiver 101 and the first driver 401 when the first sound transceiver 101 functions as a speaker.

The first driver 401 may include, as illustrated in FIG. 5, a transformer 510, an amplifier 520, and a bias power 530.

The amplifier 520 may amplify sound signals input to a first input terminal 51 and output the amplified sound signal. Further, a second input terminal 52 of the amplifier 520 may be grounded.

The transformer 510 may transform the sound signal amplified by the amplifier 520 and output the transformed sound signal. A first input terminal 11 of the transformer 510 may be connected to the amplifier 520 through a first resistor R1. A second input terminal 12 of the transformer 510 may be connected to the amplifier 520 through a second resistor R2. A first output terminal 21 of the transformer 510 may be connected to the first upper electrode 301U. In this case, the first output terminal 21 may be connected to the conductive layer of the first upper electrode 301U through the input terminal 383. A second output terminal 22 of the transformer 510 may be connected to the first lower electrode 301L. In this case, the second output terminal 22 may be connected to the conductive layer of the first lower electrode 301L through the input terminal 381. A center-point terminal 31 of the transformer 510 may be connected to ground, which is a reference potential of the first driver 401, through a third resistor R3.

The bias power may generate a first bias voltage, which is a DC voltage. One terminal of the bias power may be connected to the first vibration plate 351 through a fourth resistor R4 and another terminal thereof may be connected to ground, which is a reference potential of the first driver 401. The bias power may apply the first bias voltage to the first vibration plate 351.

With the above described configuration, operation of the first driver 401 and the first sound transceiver 101 are described below in detail.

When a sound signal is inputted to the amplifier 520 and amplified, voltage corresponding to the amplified sound signal is applied to the first upper electrode 301U and the first lower electrode 301L through the transformer 510. Then, when a potential difference occurs between the first upper electrode 301U and the first lower electrode 301L by the applied voltage, electrostatic force may be applied to the first vibration plate 351 between the first upper electrode 301U and the first lower electrode 301L. The electrostatic force may exert its influence in a direction to draw the first vibration plate 351 toward one of the first upper electrode 301U and the first lower electrode 301L. Due to the electrostatic force, the first vibration plate 351 may be more adjacently disposed to one of the first upper electrode 301U and the first lower electrode 301L.

For instance, it is assumed that a positive voltage is applied to the first upper electrode 301U by the sound signal applied to the first driver 401 and a negative voltage is applied to the first lower electrode 301L. In this case, since the first vibration plate 351 is applied with a positive voltage due to the bias power, electrostatic force between the first vibration plate 351 and the first upper electrode 301L, to which voltages of an identical polarity are respectively applied, may become relatively weak, whereas electrostatic force between the first vibration plate 351 and the first lower electrode 301L, to which voltages of the opposite polarities are respectively applied, may become relatively strong. Accordingly, the first vibration plate 351 may be drawn toward the first lower electrode 301L.

In contrast, it is assumed that a negative voltage is applied to the first upper electrode 301U by the sound signal applied to the first driver 401 and a positive voltage is applied to the first lower electrode 301L. In this case, since the first vibration plate 351 is applied with a positive voltage due to the bias power, electrostatic force between the first vibration plate 351 and the first lower electrode 301L, to which voltages of the identical polarity are respectively applied, may become relatively weak, whereas electrostatic force between the first vibration plate 351 and the first upper electrode 301U, to which voltages of the opposite polarities are respectively applied, may become relatively strong. Accordingly, the first vibration plate 351 may be drawn toward the first upper electrode 301U.

Accordingly, as the first vibration plate 351 changes its position toward the first upper electrode 301U or the first lower electrode 301L according to the sound signal, the first vibration plate 351 may vibrate. Accordingly, sound waves may occur from the first vibration plate 351, and thus the sound waves may be released outwardly through the first speaker grill 201.

Figure 6:
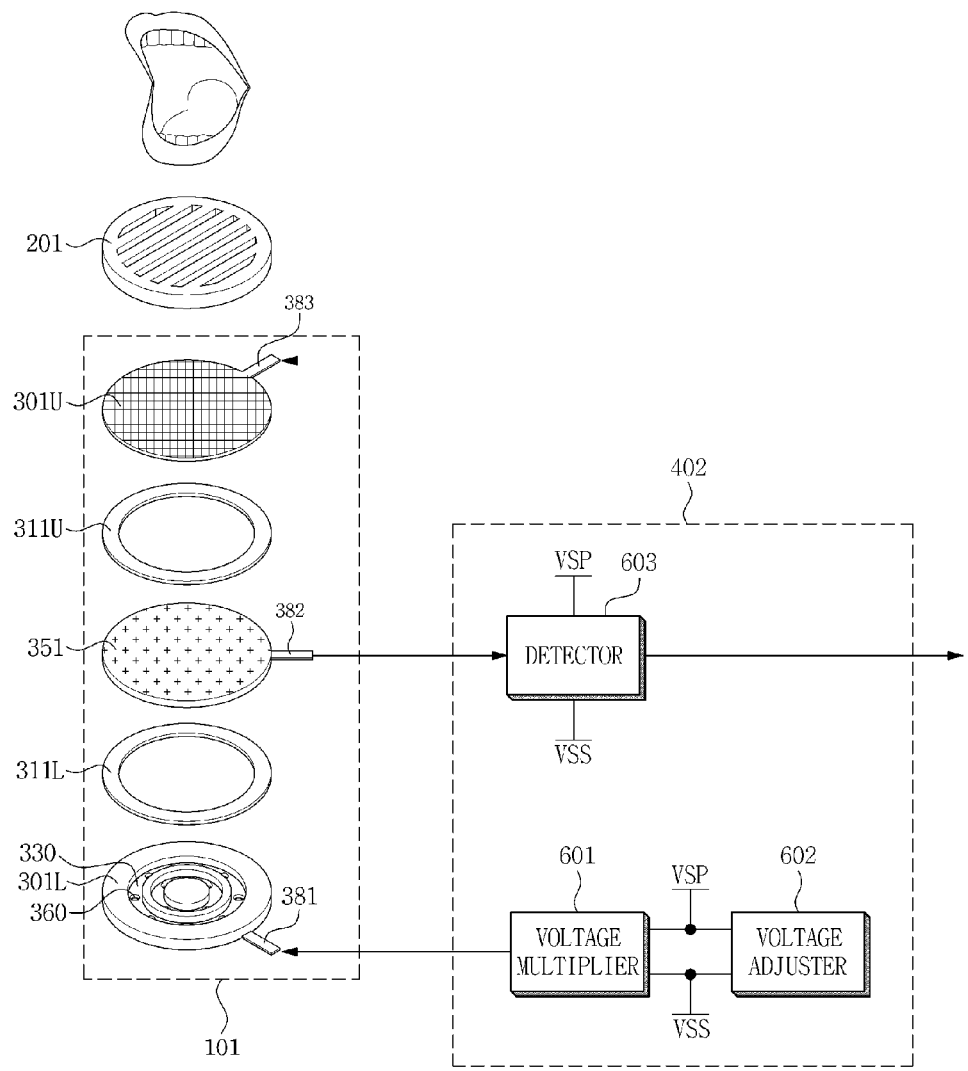
FIG. 6 is a detailed configuration view illustrating a second driver of FIG. 4.

FIG. 6 is a detailed configuration view illustrating the second driver 402 of FIG. 4. In particular, FIG. 6 illustrates connection relationship between the first sound transceiver 101 and the second driver 402 when the first sound transceiver 101 functions as a mike.

The second driver 402 may include, as illustrated in FIG. 6, a voltage adjuster 602, a voltage multiplier 601, and a detector 603.

The voltage adjuster 602 may generate first and second reference voltages based on an externally applied power voltage. The first reference voltage may be a positive voltage and the second reference voltage may be a negative voltage. Herein, the second reference voltage may be ground. Meanwhile, the voltage adjuster 602 may include a band gap reference circuit and may be a high-precision regulator having tolerance to temperature variation.

The voltage multiplier 601 may generate a second bias voltage, which is a DC voltage, based on the first and second reference voltages applied from the voltage adjuster 602. The second bias voltage applied from the voltage multiplier 601 may be applied to the first lower electrode 301L.

The detector 603 may detect sound signals from the first sound transceiver 101. Further, the detector 603 may further perform processes of reducing impedance of the detected sound signal, amplifying the modulated sound signal, and converting the amplified sound signal into a digital signal. A detection terminal of the detector 603 may be electrically connected to the first vibration plate 351. Meanwhile, the detector 603 may receive the first and second reference voltages from the voltage adjuster 602.

With the above configurations, operation of the second driver 402 and operation of the first sound transceiver 102 based on the operation of the second driver 402 are described below in detail.

When the first vibration plate 351 vibrates by sound externally applied through the first speaker grill 201, the distance between the first vibration plate 351 and the first lower electrode 301L may be changed. With the change of the distance, capacitance between the first vibration plate 351 and the first lower electrode 351L may vary. The detector 603 may detect the change of the capacitance. The detected difference of the capacitance is a sound signal. The detected sound signal may have significantly high impedance, and may have low tolerance to external noise. Accordingly, the detector 603 may reduce impedance of the sound signal and amplify the signal. Then, the detector 603 may convert the amplified sound signal into a digital signal.

Meanwhile, when the first sound transceiver 101 is connected to the first driver 401 as illustrated in FIG. 5, the second sound transceiver 102 may be connected to the second driver 402. That is, the second sound transceiver 102 may function as a mike. Herein, although not illustrated, connection relationship between the second sound transceiver 102 and the components of the second driver 402 when the second sound transceiver 102 functions as a mike is substantially identical to connection relationship between the first sound transceiver 101 and the components of the second driver 402 when the first sound transceiver 101 functions as a mike, and thus FIG. 6 and related description may be referred to.

Further, when the first sound transceiver 101 is connected to the second driver 402 as illustrated in FIG. 6, the second sound transceiver 102 may be connected to the first driver 401. That is, the second sound transceiver 102 may function as a speaker. Herein, although not illustrated, connection relationship between the second sound transceiver 102 and the components of the first driver 401 when the second sound transceiver 102 functions as a speaker is substantially identical to connection relationship between the first sound transceiver 101 and the components of the first driver 401 when the first sound transceiver 101 functions as a speaker, and thus FIG. 5 and related description may be referred to.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A mobile communication device comprising:
   a first sound transceiver comprising a first lower electrode, a first upper electrode, and a first vibration plate between the first lower electrode and the first upper electrode;
   a second sound transceiver comprising a second lower electrode, a second upper electrode, and a second vibration plate between the second lower electrode and the second upper electrode;
   a position sensor configured to perform a detection of a relative positional relationship between the first and second sound transceivers; and
   a controller configured to apply a sound signal to one of the first and second sound transceivers and detect a sound signal from the other one thereof, based on the detection result provided from the position sensor,
   wherein the first and second lower electrodes have a groove and a hole formed within the groove and extending through corresponding lower electrodes.

2. The mobile communication device of claim 1, wherein the controller applies a sound signal to the first sound transceiver and detects a sound signal from the second sound transceiver, when the first sound transceiver is placed higher than the second sound transceiver.

3. The mobile communication device of claim 2, wherein the controller applies a sound signal to the first lower electrode and the first upper electrode and applies a first bias voltage to the first vibration plate, and applies a second bias voltage to the second lower electrode and detects a sound signal from the second vibration plate.

4. The mobile communication device of claim 1, wherein the controller applies a sound signal to the second sound transceiver and detects a sound signal from the first sound transceiver, when the second sound transceiver is placed higher than the first sound transceiver.

5. The mobile communication device of claim 4, wherein the controller applies a sound signal to the second lower electrode and the second upper electrode and applies a second bias voltage to the second vibration plate, and applies a first bias voltage to the first lower electrode and detects a sound signal from the first vibration plate.

6. The mobile communication device of claim 1, further comprising a spacer disposed at least one of between the first lower electrode and the first vibration plate, between the first vibration plate and the first upper electrode, between the second lower electrode and the second vibration plate, and between the second vibration plate and the second upper electrode.

7. The mobile communication device of claim 1, wherein the controller comprises:
a first driver configured to amplify an externally applied sound signal and generate a first bias voltage;
a second driver configured to detect a sound signal from one of the first and second sound transceivers and generate a second bias voltage; and
a switch configured to apply the amplified sound signal and the first bias voltage applied from the first driver to one of the first and second sound transceivers and to apply the second bias voltage applied from the second driver to the other one thereof, based on the detection result provided from the position sensor.

8. The mobile communication device of claim 7, wherein, when the first sound transceiver is placed higher than the second sound transceiver,
the first driver applies a sound signal to the first lower electrode and the first upper electrode and applies a first bias voltage to the first vibration plate; and
the second driver applies a second bias voltage to the second lower electrode and detects a sound signal from the second vibration plate.

9. The mobile communication device of claim 7, wherein, when the second sound transceiver is placed higher than the first sound transceiver,
the first driver applies a sound signal to the second lower electrode and the second upper electrode and applies a first bias voltage to the second vibration plate; and
the second driver applies a second bias voltage to the first lower electrode and detects a sound signal from the first vibration plate.

10. The mobile communication device of claim 7, wherein the first driver comprises:
an amplifier configured to amplify an externally applied sound signal;
a transformer configured to transform the amplified sound signal applied from the amplifier; and
a bias power configured to generate the first bias voltage.

11. The mobile communication device of claim 7, wherein the second driver comprises:
a voltage adjuster configured to generate first and second reference voltages based on an externally applied power voltage;
a voltage multiplier configured to generate a second bias voltage based on the first and second reference voltages applied from the voltage adjuster; and
a detector configured to detect a sound signal from one of the first and second sound transceivers.

12. The mobile communication device of claim 11, wherein the detector further reduces impedance of the detected sound signal, amplifies the modulated sound signal, and converts the amplified sound signal to a digital signal.

13. The mobile communication device of claim 1, wherein the position sensor is a gravity sensor.

14. A mobile communication device comprising:
a first sound transceiver comprising a first lower electrode, a first upper electrode, and a first vibration plate between the first lower electrode and the first upper electrode,
wherein the first upper electrode includes a plurality of holes defined therein, the holes arranged in a mesh shape, and
wherein the first lower electrode comprises at least one groove, the groove being circular in shape and formed above a center portion of the first lower electrode;
a second sound transceiver comprising a second lower electrode, a second upper electrode, and a second vibration plate between the second lower electrode and the second upper electrode,
wherein the second upper electrode includes a plurality of holes defined therein, the holes arranged in a mesh shape, and
wherein the first lower electrode comprises at least one groove, the groove being circular in shape and formed above a center portion of the first lower electrode;
a position sensor configured to perform a detection of a relative positional relationship between the first and second sound transceivers;
a controller configured to apply a sound signal to one of the first and second sound transceivers and detect a sound signal from the other one thereof, based on the detection result provided from the position sensor;
a first spacer disposed at least one of between the first lower electrode and the first vibration plate or between the second lower electrode and the second vibration plate; and
a second spacer disposed at least one of between the first vibration plate and the first upper electrode or between the second vibration plate and the second upper electrode.

15. The mobile communication device of claim 14, wherein the controller applies a sound signal to the first sound transceiver and detects a sound signal from the second sound transceiver, when the first sound transceiver is placed higher than the second sound transceiver.

16. The mobile communication device of claim 15, wherein the controller applies a sound signal to the first lower electrode and the first upper electrode and applies a first bias voltage to the first vibration plate, and applies a second bias voltage to the second lower electrode and detects a sound signal from the second vibration plate.

17. The mobile communication device of 14, wherein the controller applies a sound signal to the second sound transceiver and detects a sound signal from the first sound transceiver, when the second sound transceiver is placed higher than the first sound transceiver.

18. The mobile communication device of claim 17, wherein the controller applies a sound signal to the second lower electrode and the second upper electrode and applies a second bias voltage to the second vibration plate, and applies a first bias voltage to the first lower electrode and detects a sound signal from the first vibration plate.

19. The mobile communication device of claim 14, wherein the first and second lower electrodes have a hole formed within the groove and extending through corresponding lower electrodes.

20. The mobile communication device of claim 14, wherein the controller comprises:
a first driver configured to amplify an externally applied sound signal and generate a first bias voltage;
a second driver configured to detect a sound signal from one of the first and second sound transceivers and generate a second bias voltage; and
a switch configured to apply the amplified sound signal and the first bias voltage applied from the first driver to one of the first and second sound transceivers and to apply the second bias voltage applied from the second driver to the other one thereof, based on the detection result provided from the position sensor.

* * * * *